Figure 1:
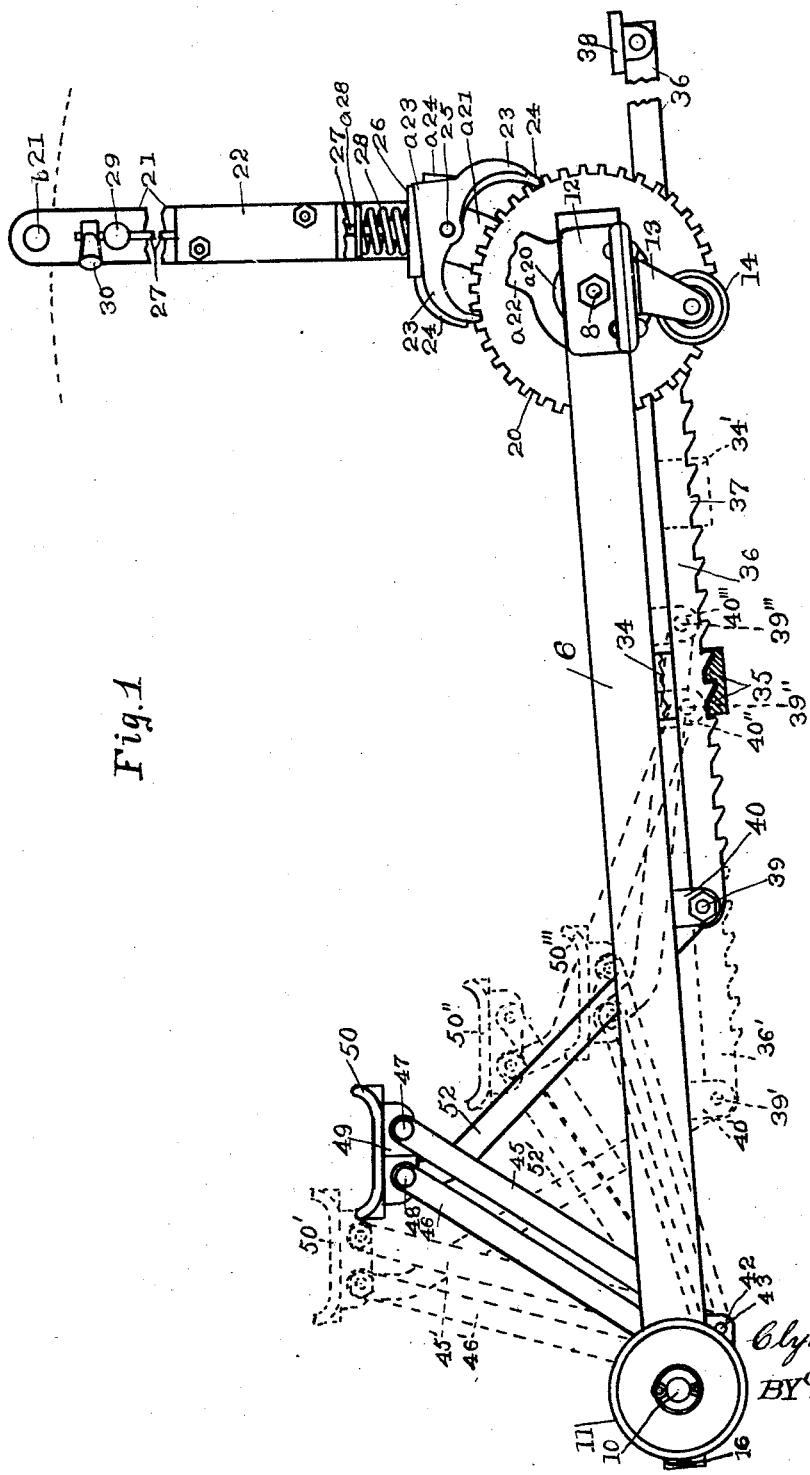

March 6, 1928.  1,661,791

C. A. DUTRO

HOISTING JACK

Filed March 10, 1927  2 Sheets-Sheet 1

INVENTOR,
Clyde A. Dutro.
BY David E. Lain,
ATTORNEY.

March 6, 1928.
C. A. DUTRO
1,661,791
HOISTING JACK
Filed March 10, 1927
2 Sheets-Sheet 2
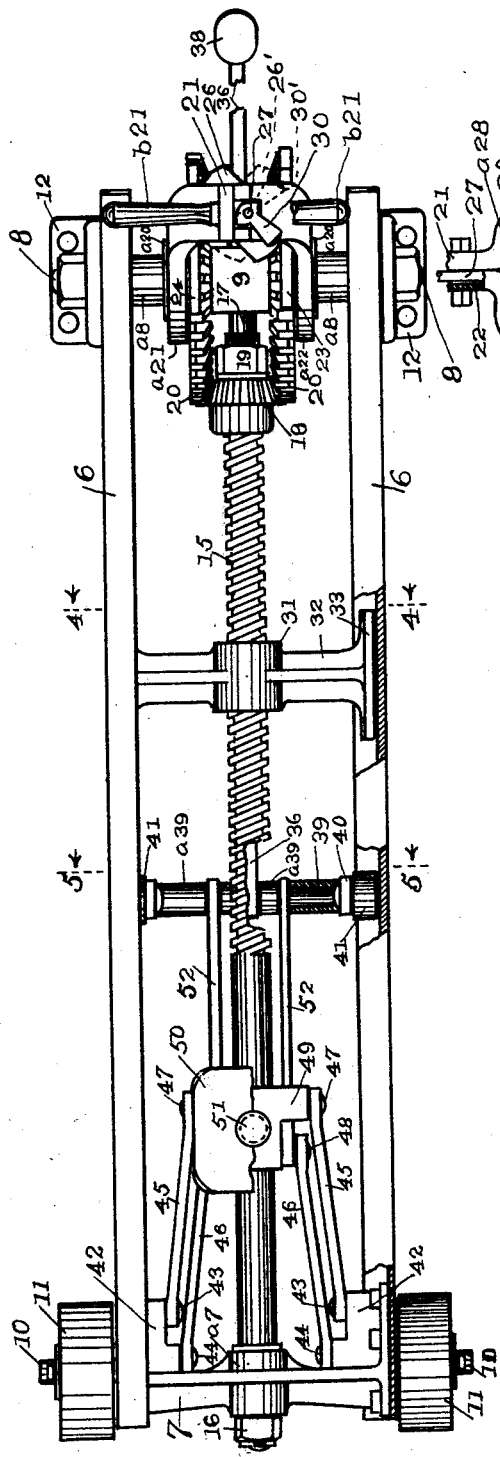
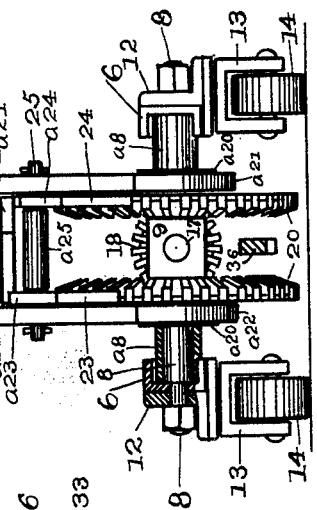
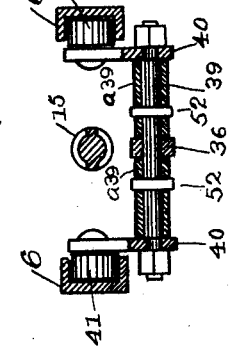
INVENTOR,
Clyde A. Dutro.
BY David E. Lain,
ATTORNEY.

Patented Mar. 6, 1928.

1,661,791

UNITED STATES PATENT OFFICE.

CLYDE A. DUTRO, OF BOW, WASHINGTON, ASSIGNOR OF ONE-HALF TO HAROLD T. MORTON, OF BELLINGHAM, WASHINGTON.

HOISTING JACK.

Application filed March 10, 1927. Serial No. 174,137.

My invention relates to improvements in hoisting jacks especially for automobiles more particularly for use in garages, and an object of my improvement is to provide a jack that will positively retain the load in elevated position till it is desired to be lowered. Another object of my improvement is to provide a rapidly operating garage jack. And a further object of my improvement is to provide a positive dolly jack of simple design suitable for construction at reasonable expense for light or heavy duty.

I attain these objects with the mechanism illustrated in the accompanying two sheets of drawings which form a part of this specification and in which Figure 1 is a side elevation of my jack, Fig. 2 is a plan view of Fig. 1, Fig. 3 is an elevation view of the front end only of Fig. 2, Fig. 4 is a sectional view of Fig. 2 on the line 4—4 and Fig. 5 is a sectional view of Fig. 2 on the line 5—5.

Similar characters refer to similar parts in the several views. Certain parts are broken away for lack of space or to show other parts hidden thereby.

With more particular attention to those parts given reference characters: The machine frame consists of two channel bars 6, 6 disposed parallel with channels opposite at their rear ends fastened rigidly together by end frame bracket 7 and fastened together at their front ends by shaft bolt 8 having ends of reduced diameter extended through opposite holes through channel bars 6 and provided at each end with nuts which clamp said bars to the shoulders of said bolt. Shaft 8 has central enlargement 9. Short shafts 10, 10 are in line and integral with each end of end bracket 7 and are extended through opposite holes in bars 6. On each of shafts 10 is mounted wheel 11 for revolution thereon as carriage wheels for the rear end of the jack frame.

On the outer sides of the front ends of bars 6 are fastened brackets 12, 12. Underneath each of brackets 12 is fastened for revolution a caster wheel frame or yoke 13 and in each yoke is mounted caster wheel 14 for revolution. Caster or dolly wheels 14, 14 serve as carriage wheels for the front end of the jack frame and because of their swivelling mounting provide for easy dirigibility of the loaded jack.

Jack screw 15 has its ends of reduced diameter to serve as journals. The front end 17 thereof is mounted for revolution in a central hole in enlargement 9 of shaft 8, and the rear end thereof is mounted for revolution in bearing $a^7$ of bracket 7 and is retained therein for revolution by nut 16 on the protruding end thereof. The rear journal end of said screw 15 is of reduced diameter, as stated, and bearing $a^7$ is between the shoulder of the screw and nut 16 and thus serves as a double thrust bearing also.

Bevel spur gear 18 is mounted on the forward end of screw 15 between a shoulder of said screw and the threaded end of a cylinder of reduced diameter but larger than 17 and is fixed on said cylinder with a key, not shown, and retained against said shoulder by nut 19 on said threaded end.

Combined ratchet and bevel gears 20, 20 are mounted for revolution facing each other on shaft 8 next to enlargement 9 and are retained in place in engagement with gear 18 by sleeves $a^8$, $a^8$ on shaft 8 between the webs of channel bars 6 and the hubs $a^{20}$, $a^{20}$ of said combined gear wheels.

The shank end of jack handle 21 is bent rearward at $a^{21}$ in Fig. 1 and provided with a hole for mounting for oscillation on hub $a^{20}$ on the right-hand gear 20, and said shank is also bent laterally to form one-half of a yoke. The other half of said yoke 22 is similarly bent and fastened to handle 21 together with which it constitutes the complete handle and yoke shank of the jack.

As a part of the operating means there are two double bitted dogs or anchors 23 and 24 both mounted for oscillation on shaft 25 fastened in opposite holes in shank $a^{21}$, $a^{22}$ and each retained in proximity to one of the members of said shank by sleeve $a^{25}$ on said shaft 25. Said anchors are mounted to allow engagement of but one bit of each with the ratchet teeth of wheels 20 at a time. Anchor 23 has table top $a^{23}$ and anchor 24 has table top $a^{24}$ extending forwardly from above the pivot thereof. These tables are required to level the tops of said anchors due to their angular contact with wheels 20, as easily seen in Fig. 1. To attain this angular relation with said ratchet wheels handle 21 is offset forward of the center of said wheels. This offset is desirable to provide a large angular swing of said handle before causing said dogs to contact with gear 18. It is desired that anchors 23 and 24 may engage alternately rearward and forward and simultaneously diagonally with the ratchet teeth of wheels 20. To attain this sectoral plate 26 is provided to have diagonally opposite corners thereof bear on said anchors forward and rearward, or the reverse, of their pivotal points simultaneously. Said plate is mounted fixed on the lower end of control shaft 27 for oscillation therewith. Said shaft 27 is mounted for oscillation in a groove in yoke member 22, at its lower end, and in bearing 29, fastened to the upper end of handle 21, at its upper end. To the upper end of shaft 27 is fastened control handle 30 which is shaped at its end next said handle 21 to limit the oscillations of shaft 27 to an angle of 90°.

With control handle 30 and plate 26 in their full-line positions the rearward end of plate 26 bears on anchor 23 rearward of its pivot and the forward end of said plate bears on the anchor 24 forward of its pivot. Coil spring 28 is mounted on shaft 27 to react between plate 26 and washer $a^{28}$ in the crotch of the handle yoke and pressure from said spring bears down on plate 26 to cause the rear bit of anchor 23 and the forward bit of anchor 24 to simultaneously engage with ratchets 20, 20, in which positions oscillations of handle 21 will cause wheels 20, 20 to be revolved in opposite directions and cause gear 18 and screw 15 to revolve in a counterclockwise direction. While when control handle 30 is in its dotted-line position at 30' the rearward end of plate 26, which is in its dotted-line position at 26', bears on anchor 24 rearward of its pivot causing the rear bit of said anchor to engage with its ratchet and the forward end of said plate is caused to bear on anchor 23 forward of its pivot causing the forward bit of anchor 23 to engage with its ratchet, and now successive oscillations of handle 21 will cause screw 15 to revolve in a clockwise direction. In this manner the set of control handle 30 in either of its extreme positions will cause either clockwise or counter clockwise revolutions of screw 15. But when said control handle 30 is set in its neutral position at right angles to handle 21, the ends of plate 26 bear on anchors 23 and 24 above their pivotal points and both bits of each of said anchors are held out of engagement with ratchets 20 and the oscillation of handle 21 will not cause said ratchet wheels or said screw to revolve.

Nut 31 is engaged on screw 15 and is integral with cross head 32 which has slides 33, 33 mounted in the channels of frame bars 6 for reciprocal sliding therein. Loop 34 is fastened to the bottom of nut 31 and has pawl teeth 35 in the bottom thereof. Ratchet bar 36 is extended through said loop and its teeth 37 are engageable with teeth 35 in said loop. Said ratchet bar extends beneath screw 15 longitudinally of the machine frame and its forward end projects forward of the frame and has pedal 38 fastened on top of the forward end thereof. The rearward end of ratchet bar 36 has a hole therethrough by which it is mounted on pivot bolt 39. The ends of bolt 39 are of reduced diameter and are extended through holes in the lower ends of arms 40, 40 to which they are clamped by nuts engaged on said bolt ends. Stud shafts in line are fastened to the upper ends of arms 40 on each of which is mounted one of wheels 41 for revolution. Said wheels are also engaged in the frame channels for rolling therein. This construction provides mounting for bolt 39 which serves as a cross head and moves parallel with the screw cross head under control of ratchet bar 36; since said ratchet bar may be set free from the nut cross head by raising the forward end thereof till its teeth disengage from teeth 35 when it may be freely moved through loop 34 in either direction to set bolt 39 in any desired position relative to nut cross head 32. But when bar 36 is engaged with nut 31 the pivot bolt crosshead and the nut crosshead are both moved rearward simultaneously under the action of screw 15.

Lugs 42, 42 are fastened to end frame bracket 7 and extend downward therefrom at the ends thereof. They are preferably integral with said bracket. Each of said lugs has a pair of parallel holes therein opposite and in line in the two lugs, in which are fastened rivets 43, 44 and 43, 44.

The lower ends of links 45, 45 are pivoted on rivets 43, 43 while the lower ends of links 46, 46 are pivoted on rivets 44, 44. Links 45, 45 and 46, 46 constitute two pairs of parallel motion links and have their upper ends pivoted to head block 49 by rivets 47, 47 and 48, 48, the last of which is not shown. The latter pairs of rivets are spaced equally with said former and lower pairs and as head block 49 moves it must pass from and to parallel positions.

It may be noticed from Fig. 1 that the rear end of the jack frame is lower than the front end thereof. Pairs of rivets 43, 43 and 44, 44 are preferably all in the same horizontal plane so that head block 49 is likewise retained in horizontal planes. On top of block 49 is pivoted cap plate 50 by central flat-head rivet 51 on which said plate is free to revolve. The corners of plate 50 are preferably upturned as shown.

The upper ends of a pair of equal links 52, 52 are pivoted to rivet 48 preferably one between each of links 46, 46 and block 49. The lower ends of said links 52 each have a hole therethrough in line by which they are mounted for oscillation on bolt 39, which has four sleeves $a^{39}$ thereon to properly space links 52 and bar 36 thereon between arms 40.

Head block 49 is thus supported on pairs of parallel links 45, 45 and 46, 46 and pair of equal links 52, 52, and the height of said block above the jack frame will lessen as shaft 39 recedes from lugs 42 and also the reverse is true.

The operation of the jack will now be easily understood.

Assume that one of the axles of an automobile is to be raised, and that cap plate 50 is at a lower level than the bottom of said axle. Said plate 50 is brought to a position beneath said axle by rolling the jack to a place where this relation will pertain and, assuming nut 31 to be in its full-line position, cap plate 50 is quickly raised to bear beneath said axle by pushing ratchet bar 36 rearward till this contact occurs. Then bar 36 is engaged with teeth 35 and with control handle 30 in its full-line position handle 21, which for convenience is provided with handle bar $b^{21}$, is oscillated back and forth causing screw 15 to revolve in a counter clockwise direction and driving nut 31 and also bolt 39 rearward causing plate 50 to move upward and carry said automobile axle with it till said plate has reached position 50′ which it is assumed provides the desired elevation for the automobile axle.

Now notice that the weight on the jack bearing downward on plate 50 tends to force bolt 39 forward thus causing teeth 37 to bear against teeth 35. These teeth are ratchet shape by construction and can not be separated without exerting an upward pressure on bar 36. To disengage these teeth when a considerable pressure is supported on plate 50 has, in practice, been found to require so great a force applied to lift bar 36 that it will not accidentally occur. So that the jack is practically positive in supporting the load in so far as the engagement between bar 36 and nut 31 is concerned. Then since nut 31 can not be moved longitudinally without revolving screw 15, by the simple expedient of turning control handle 30 to its neutral position screw 15 is not moved when handle 21 is reciprocated and the jack is fully positive in this regard.

To lower plate 50 from its elevated position control handle 30 is turned to its dotted-line position at 30′ and handle 21 is worked as before with the result that screw 15 will be revolved in a clockwise direction causing nut 31 to move forward and also causing bolt 39 to move away from lugs 42 and thus lowering said plate 50, and said plate may be caused to descend till free from the axle when the jack may be moved from beneath the axle if so desired.

The engagement of ratchet bar 36 with loop 34 is positive in one direction only, so that forward movement of nut 31 will not of itself cause crosshead bolt 39 to follow in a forward direction. However, the structural weight alone of block 49 and the links connected therewith is sufficient to cause the spreading apart of these links at the bottom and said crosshead bolt will move forward under operation of lateral pressure from this weight whenever afforded opportunity to do so; and in practice the two crossheads work in unison except when the bolt crosshead is under control of bar 36 alone.

With the nut cross head in its forward position, as indicated in dotted lines at 34′ in Fig. 1, the bolt crosshead may occupy its dotted line position at 39″ when cap plate 50 will be at the lower level at 50″. Also, the bolt crosshead may be moved to its extreme forward position, indicated in dotted lines at 39‴, when cap plate 50 will occupy its extreme low position at 50‴. When in this last-mentioned position the position in elevation above the floor of cap plate 50 is so low that the jack may be set beneath a very low object.

Although, as stated, in the illustrations herewith the jack frame is slightly elevated above the horizontal at its forward end, this is not essential to the proper operation of the jack and for the purposes of the claims the jack frame will be regarded as horizontal.

Having thus disclosed my invention, what I claim as new therein and desire to secure by Letters Patent is,—

1. A hoisting jack consisting of a horizontally-disposed dolly carriage frame, a hand-operated, double-acting, ratchet and pawl, and bevel-gear driving mechanism, mounted on said frame, a jack screw mounted at one end for revolution on said frame and journaled on its other end, in said driving mechanism, a bevel gear fixed on said jack screw drivably engaged by said driving mechanism, a jack head block connected by parallel-motion pivoted links with said frame also connected by pivoted links with a bolt crosshead, a bolt crosshead slidable in guides on said frame, a nut crosshead engaged with said jack screw slidable in guides on said frame, pawl teeth fastened on said nut crosshead, and a ratchet bar pivotally engaged with said bolt crosshead manually engageable with and disengageable from said pawl teeth.

2. A hoisting jack consisting of a horizontally disposed dolly carriage frame, a stationary shaft fastened in one end of said frame having a transverse journal bearing midway therein, a pair of combined ratchet and driver bevel gears mounted for revolution on said fixed shaft with said shaft journal therebetween, a jack screw journaled for revolution at one end in a bearing on the other end of said frame and at its other end in said fixed shaft bearing, a driven bevel gear fixed on said jack screw engaged by both of said driver bevel gears, a handle having a shank mounted for oscillation concentric with said fixed shaft, two anchor pawls mounted for oscillation on said handle shank each engageable by either bit thereof with one of said ratchets, means to cause the simultaneous engagement of diagonally opposite bits of said anchors with said ratchets and also to cause the simultaneous disengagement of all of the bits of said anchors from said ratchets, a jack head block, parallel-motion links pivotally connected to said frame and to said head block, a bolt crosshead reciprocal in guides on said frame, a pivoted link connection between said head block and said bolt crosshead, a nut crosshead engaged with said jack screw slidable in guides on said frame, pawl teeth fastened to said nut crosshead, and a ratchet bar pivoted on said bolt crosshead engageable with and disengageable from said pawl teeth.

3. A hoisting jack consisting of a horizontally disposed dolly carriage frame, parallel-motion links pivoted to said frame below and to a jack head block above, a bolt crosshead reciprocal in guides in said frame, pivoted link connection between said bolt crosshead below and said head block above, a jack screw mounted for revolution in bearings in said frame at right angles with said crosshead, a nut crosshead engaged with said screw slidable in guides in said frame operable parallel with said bolt crosshead, pawl teeth fastened to said nut crosshead, a ratchet bar pivoted to said bolt crosshead and engageable with said pawl teeth, and means to revolve said jack screw.

CLYDE A. DUTRO.